(12) United States Patent
Hood (10) Patent No.: US 9,028,566 B2
(45) Date of Patent: May 12, 2015

(54) TRANSFER MECHANISM

(75) Inventor: Peter David Hood, Loughborough (GB)

(73) Assignee: Intelligent Energy Limited, Loughborough (GB)

( * ) Notice: Subject to any disclaimer, the term of this patent is extended or adjusted under 35 U.S.C. 154(b) by 91 days.

(21) Appl. No.: 13/521,646

(22) PCT Filed: Dec. 31, 2010

(86) PCT No.: PCT/GB2010/002349
§ 371 (c)(1),
(2), (4) Date: Aug. 14, 2012

(87) PCT Pub. No.: WO2011/086340
PCT Pub. Date: Jul. 21, 2011

(65) Prior Publication Data
US 2012/0312446 A1  Dec. 13, 2012

(30) Foreign Application Priority Data
Jan. 15, 2010 (GB) .................................. 1000651.8

(51) Int. Cl.
*B65H 29/24* (2006.01)
*H01M 8/02* (2006.01)
*B65H 5/22* (2006.01)

(52) U.S. Cl.
CPC .......... *B65H 29/241* (2013.01); *H01M 8/0271* (2013.01); *Y02E 60/50* (2013.01); *Y02E 60/521* (2013.01); *B65H 5/222* (2013.01); *B65H 2406/3314* (2013.01); *B65H 2406/344* (2013.01); *B65H 2406/3614* (2013.01); *B65H 2801/72* (2013.01)

(58) Field of Classification Search
None
See application file for complete search history.

(56) References Cited

U.S. PATENT DOCUMENTS

| | | | |
|---|---|---|---|
| 4,425,181 A | 1/1984 | Bahr et al. | |
| 4,541,886 A | 9/1985 | Marlow et al. | |
| 4,849,062 A * | 7/1989 | Jennet et al. | 156/364 |
| 4,927,479 A * | 5/1990 | Bock | 156/228 |
| 2006/0022081 A1 * | 2/2006 | Puffer, Jr. | 242/523 |
| 2007/0187026 A1 | 8/2007 | Burgess et al. | |
| 2008/0254332 A1 * | 10/2008 | Eun et al. | 429/30 |
| 2009/0029231 A1 * | 1/2009 | Hood et al. | 429/35 |

FOREIGN PATENT DOCUMENTS

| | | |
|---|---|---|
| DE | 9311454 | 7/1993 |
| EP | 0291362 | 11/1988 |
| GB | 1193388 | 5/1970 |
| WO | WO 96/23470 | 8/1996 |
| WO | WO 98/00356 | 1/1998 |
| WO | WO 2004/021485 | 3/2004 |

\* cited by examiner

*Primary Examiner* — Patrick Ryan
*Assistant Examiner* — Wyatt McConnell
(74) *Attorney, Agent, or Firm* — Baker & Hostetler LLP (57) ABSTRACT

A mechanism for transferring a flexible sheet material (202) from a first substrate (203) to a second substrate (204) is disclosed, the mechanism having a head rotatable and translatable relative to the first and second substrates, the head (201) comprising a cylindrical curved portion (205) having an outer face (207) across which are provided openings (206) configured to apply air pressure to sheet material (202) contacting the outer surface (207) such that the head (201) is adapted to transfer the sheet material (202) from the first substrate (203) to the second substrate (204) by a combination of rotation and translation of the head (201).

9 Claims, 5 Drawing Sheets

TRANSFER MECHANISM

RELATED APPLICATION

This application claims the full Paris Convention Priority from, and is a U.S. National Stage entry of PCT/GB2010/002349 filed Dec. 31, 2010; which is based upon GB 1000651.8 filed Jan. 15, 2010, as if fully set forth herein in their entirety.

FIELD

The disclosure relates to apparatus and methods for transferring flexible adhesive films using a rotatable and translatable head, with particular relevance in assembling gasket components and membrane electrode assemblies in manufacturing processes for fuel cells.

BACKGROUND

Fuel cells based on proton exchange membrane technology are typically assembled by laminating together a large number of individual cells. Each cell comprises a membrane-electrode assembly (MEA) with associated anode and cathode plates on either side of the MEA. Gaskets are used to ensure a fluid-tight seal around the MEA.

Figure 1:
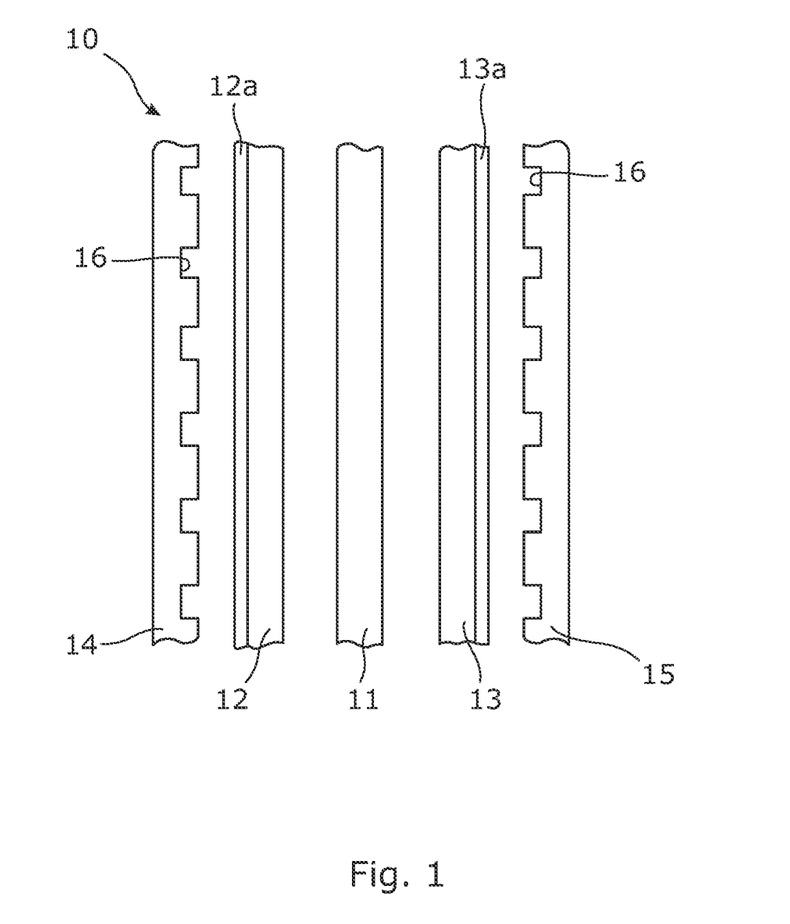
FIG. 1 is a schematic exploded cross-section of a polymer electrolyte membrane fuel cell.

A typical layout of a conventional fuel cell 10 is shown in FIG. 1 which, for clarity, illustrates the various layers in exploded form. A solid polymer ion transfer membrane 11 is sandwiched between an anode 12 and a cathode 13. Typically, the anode 12 and the cathode 13 are both formed from an electrically conductive, porous material such as porous carbon, to which small particles of platinum and/or other precious metal catalyst are bonded. The anode 12 and cathode 13 are often bonded directly to the respective adjacent surfaces of the membrane 11. This combination is commonly referred to collectively as the membrane-electrode assembly.

Sandwiching the polymer membrane 11 and porous electrode layers 12, 13 is an anode fluid flow field plate 14 and a cathode fluid flow field plate 15. Intermediate backing layers 12a, 13a, also referred to as diffuser or diffusion layers, may also be employed between the anode fluid flow field plate 14 and the anode 12 and similarly between the cathode fluid flow field plate 15 and the cathode 13. The backing layers 12a, 13a are porous to allow diffusion of gas to and from the anode and cathode surfaces as well as assisting in the management of water vapour and liquid water in the cell.

The fluid flow field plates 14, 15 are formed from an electrically conductive, non-porous material by which electrical contact can be made to the respective anode electrode 12 or cathode electrode 13. At the same time, the fluid flow field plates facilitate the delivery and/or exhaust of fluid fuel, oxidant and/or reaction product to or from the porous electrodes 12, 13. This is conventionally effected by forming fluid flow passages in a surface of the fluid flow field plates, such as grooves or channels 16 in the surface presented to the porous electrodes 12, 13.

The anode and cathode fluid flow field plates 14, 15 are electrically insulated from each other and the flow fields across the plates 14, 15 are kept fluid tight using gaskets that are positioned around the fluid field areas between the fluid flow plates and the polymer membrane 11.

To allow useful amounts of power to be generated, individual cells such as that shown in FIG. 1 need to be assembled into larger stacks of cells. This can be done by laminating multiple cells in a planar stack, resulting in alternating anode and cathode plate connections. Connecting individual cells in series allows for a higher voltage to be generated by the stack, and connecting cells or groups of cells in parallel allows for a higher current to be generated. Multiple stacks may be used to generate electrical power, for example for use in an electrical power unit for a hydrogen-powered vehicle.

Large numbers of cells need to be assembled to form each individual stack. Manufacturing such stacks therefore requires many separate steps, involving accurate positioning of the various layers making up each cell. Any misalignment can result in failure of the entire stack, for example by an electrical short-circuit or through leakage from fuel or oxidant paths. It is therefore important for the application of fuel cell technology to mass production that a manufacturing process for assembling the stack is fast, accurate and reliable.

A particular problem with assembly of such fuel cell stacks relates to the accurate positioning and alignment of components such as gaskets, which by their nature are flexible and therefore more difficult to align with respect to other less flexible components such as the metallic fluid flow field plates. Gaskets may be supplied in the form of die cut sheets of adhesive gasket material, which require removal from a backing paper before being positioned in place on a substrate, for example on a fluid flow field plate or an MEA.

Accurately positioning such adhesive materials is difficult to achieve by hand without the aid of alignment tools, and is highly labour intensive.

A further problem relating to the use of adhesive gasket materials is the possibility of air inclusions when a gasket is applied to a substrate. The presence of such inclusions could result in failure of a stack when pressure is applied during final assembly, due to an air inclusion causing a portion of a gasket to move from its position under pressure and cause a fluid leak.

It is consequently an object of the disclosure to address one or more of the above mentioned problems.

SUMMARY

In accordance with the disclosure there is provided a device for transferring a flexible sheet material from a first substrate to a second substrate, the mechanism having a head rotatable and translatable relative to the first and second substrates, the head comprising a cylindrical curved portion having an outer face across which are provided openings configured to apply air pressure to sheet material contacting the outer surface such that the head is adapted to transfer the sheet material from the first substrate to the second substrate by a combination of rotation and translation of the head.

The disclosure solves at least some problems associated with possible inclusion of air when transferring the sheet material on to the second substrate. This is particularly advantageous when applying the invention to assembly of fuel cells, where the sheet material is an adhesive gasket material. The invention also allows for the sheet material to be lifted away from the first substrate in a controlled manner, thereby minimising or avoiding distortion.

The mechanism is preferably configured to lift the sheet material from the first substrate by applying a negative air pressure to the openings while rotating the head during translation of the head relative to a surface of the sheet material.

The head may be configured to be rotatable and translatable relative to fixed first and second substrates, although in certain embodiments a portion of the relative translation of the head may be achieved by translation of the first or second substrate.

The mechanism may also be configured to apply the sheet material to the second substrate by combined rotation and translation of the head across a surface of the second substrate.

The mechanism may be configured to apply a positive air pressure to the openings during or after application of the sheet material to the surface of the second substrate.

The mechanism may be configured to apply mechanical pressure to the second substrate across the thickness of the sheet material during application of the sheet material to the surface of the second substrate.

In some instances, the cylindrical curved portion of the head is rotatable relative to a central portion of the head, the central portion of the head comprising a first port for applying negative pressure to the openings with the curved portion in a first rotated position relative to the central portion and a second port for applying a positive pressure to the openings with the curved portion in a second rotated position relative to the central portion.

The first and second ports and the openings in the curved portion may be configured to sequentially apply air pressure to the openings as the curved portion is rotated relative to the central portion.

The central portion of the head may comprise a first plenum connected to the first port extending circumferentially around a first part of the central portion of the head and a second plenum connected to the second port extending circumferentially around a second part of the central portion of the head. The first and second plenums are thereby configured to apply the positive and negative pressures to selected openings on the curved portion of the head according to the rotational position of the curved portion relative to the central portion.

According to some aspects of the disclosure there is provided a method for transferring a sheet material from a first substrate to a second substrate using a pick and place mechanism according to the first aspect of the invention, the method comprising the steps of: positioning the curved portion over the sheet material; rotating and translating the curved portion across the sheet material while applying a negative air pressure to the openings in the outer face of the curved portion; translating the sheet material on the head from the first substrate to a second substrate; and applying the sheet material to the second substrate by rotating and translating the curved portion across surface of the second substrate.

The method according to some aspects may be applied as part of a method of manufacturing a fuel cell, where the sheet material comprises an adhesive gasket material and the second substrate comprises a planar electrode component for a fuel cell assembly, such as an anode or cathode fluid flow field plate or a membrane electrode assembly.

DRAWINGS

Illustrative embodiments are described in further detail below by way of example and with reference to the appended drawings in which.

Pick and place mechanisms are commonly used in manufacturing processes, for example in surface mounting electronic components on to printed circuit boards. Such mechanisms generally use a pneumatic head that applies a vacuum to pick up a component and transports the component to a desired position on a circuit board, positioning the component in place before releasing the vacuum. Such mechanisms cannot however be used without modification for applying adhesive sheet materials, because a peeling action is required to remove an adhesive sheet from a backing.

EP0291362 discloses a labeling mechanism for a weigh/price labeling apparatus, in which self-adhesive labels on a backing strip are fed onto a temporary holder, the label being held by vacuum on the holder. A label transfer device having a carrier on an eccentric drive mechanism is used to move the label from the holder to delivery position, where the label is delivered to an article. The carrier includes a pad having ports for applying a vacuum or air pressure to hold or discharge the label from the pad. The mechanism is not, however, suitable for being adapted for use with a pick and place mechanism, and configured to provide only a limited degree of control over how different labels are transferred.

Aspects of the disclosure apply the above different principles in combination to allow adhesive backed materials to be accurately and repeatably applied from a first substrate on which the adhesive material is supplied to a second substrate on which the adhesive material is to be applied. This is achieved by means of a modified pick and place mechanism that allows for an adhesive sheet material to be peeled away from a first substrate on to a pick and place head. The head is then translated to transport the sheet material to a second substrate and the sheet is rolled on to the second substrate, thereby both accurately applying the sheet material in place and minimising air inclusions between the sheet and the substrate, while also taking advantage of the flexibility of placement associated with the use of a pick and place mechanism.

Figure 2:
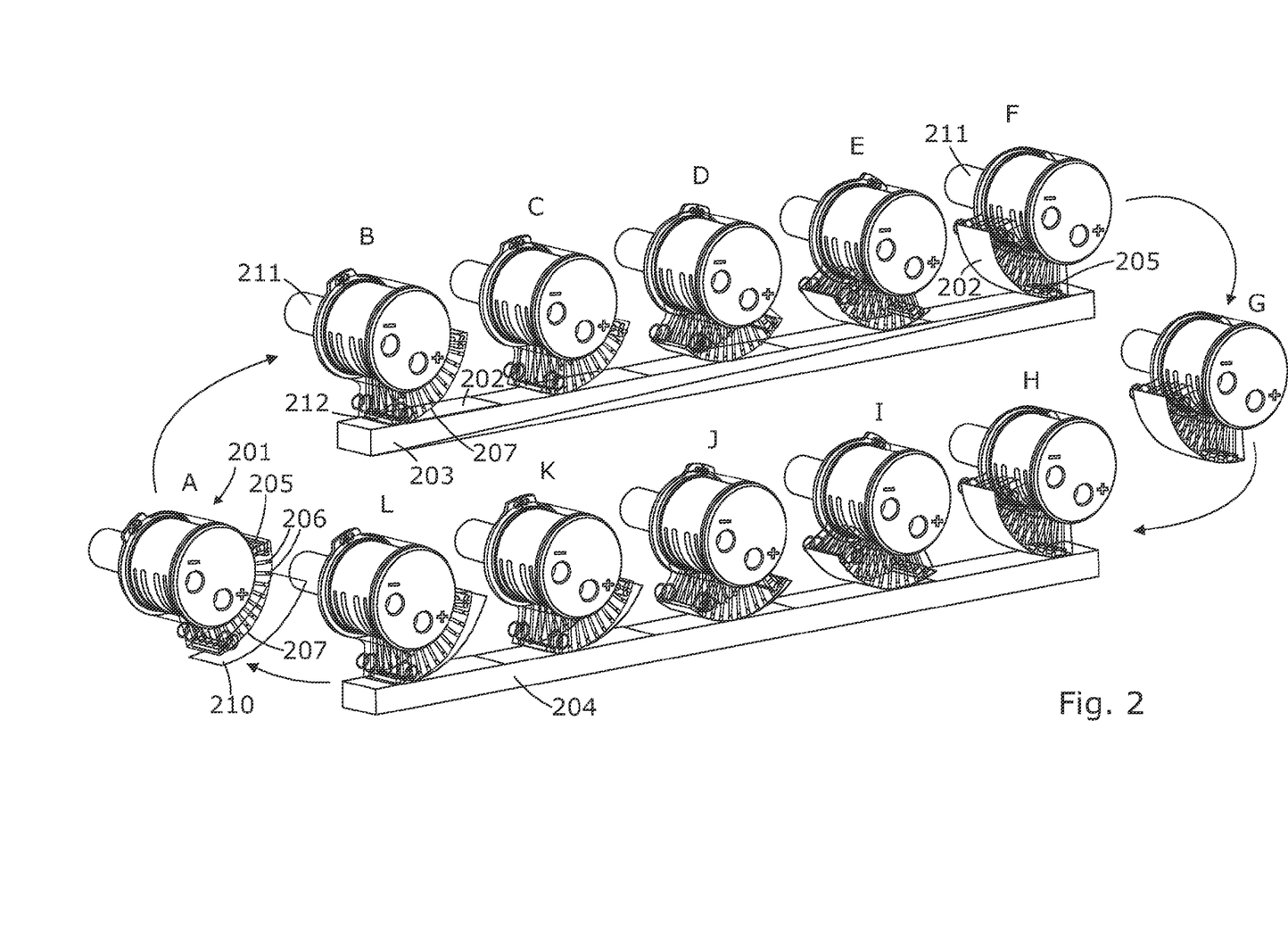
FIG. 2 is a first perspective view of a sequence of operations for transferring a sheet material from a first substrate to a second substrate.
Figure 3:
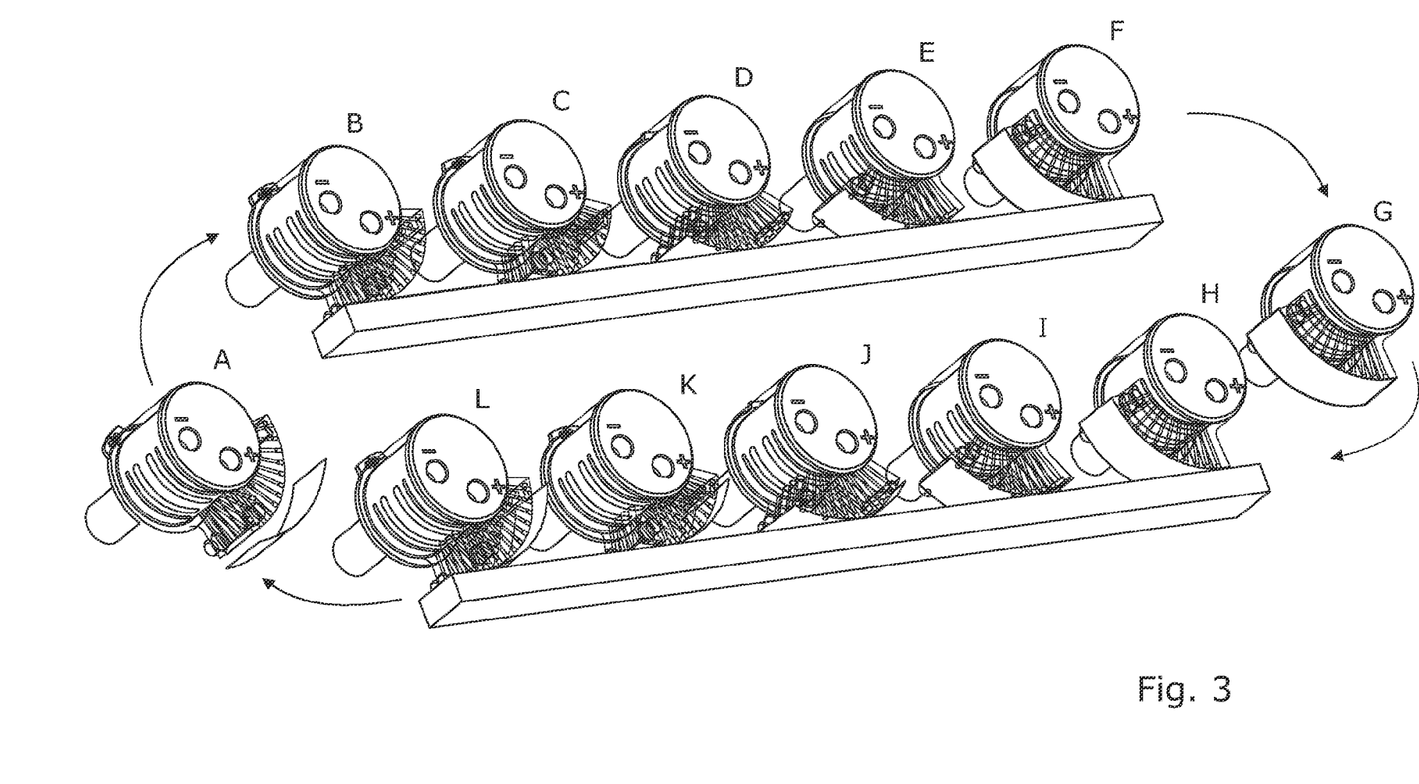
FIG. 3 is a second perspective view of the sequence of operations of FIG. 2.

At least some aspects of principles of the disclosure are illustrated in FIGS. 2 and 3, which show different perspective views of the process, in which a rotatable and translatable pick and place head 201 is used to transfer a flexible sheet material 202 from a first substrate 203 to a second substrate 204. The process is illustrated in the form of the head 201 being operated through a series of operations identified as steps A to L in FIGS. 1 and 2.

The rotatable and translatable head 201 is mounted on to a mechanism (not shown) for translating the head in vertical and horizontal directions, while the head 201 is itself configured for rotation. A cylindrical curved portion 205, also referred to as the arced portion, of the head 201 comprises a series of openings 206 across an outer face 207, the openings 206 being connected via internal passageways to a first port 208 for applying a negative air pressure (or vacuum) and to a second port 209 for applying a positive air pressure. The arrangement of the ports 208, 209 and the associated internal passageways are illustrated in further detail below with reference to FIGS. 4 and 5.

With the head 201 in the position shown in step A, the openings 206 are connected to the positive air pressure port 209, which acts to force a backing paper 210 that was previously attached to the outer face of the curved portion 207 away from the head 201. The head 201 is then translated across to the first substrate 203 to pick up a portion of sheet material 202 located on the first substrate 203. The sheet material 202 may for example be a portion of a sheet of die cut adhesive-backed gasket material. At step B, the curved portion 207 of the head 201 is rotated relative to the central portion 211 of the head 201 such that one or more openings towards a leading edge 212 of the outer face 207 are connected through to the negative air pressure port 208.

In steps B to F, the head 201 is translated relative to the first substrate 203 while the arced or curved portion 205 of the head synchronously rotates relative to the central portion 211. This may be achieved by translating the head 201 while keeping the first substrate 203 fixed, or could alternatively be achieved by translating the first substrate 203 relative to the head 201. The effect of this relative translation and rotation is to transfer the adhesive sheet material 202 from the first substrate 203 to the outer face 207 of the arced or curved portion 205 of the head 201. As the arced or curved portion 205 rotates, further openings along the outer face are sequentially connected through to the negative pressure port 208, so that the sheet material 202 is held on to the outer face by vacuum.

As shown in step F, the arced or curved portion 205 has rotated relative to the central portion 211 of the head by approximately a quarter of a turn and the sheet material 202 is completely held to the outer face 207. The head 201 then translates (step G) across to the second substrate 204 and the sheet material 202 is progressively transferred to the second substrate 204. As the sheet material is transferred, the arced or curved portion 205 rotates relative to the central portion 211 while the head translates relative to the second substrate 204. FIGS. 2 and 3 show an optional protective backing paper 210 being removed as the sheet material 202 is transferred.

From steps H to L, the openings in the arced or curved portion 205 are progressively transferred from being connected to the negative pressure port 208 to the positive pressure port 209 until, at step L, the sheet material 202 is completely adhered to the second substrate and the backing paper 210 is only partially connected to the outer face 207 of the arced or curved portion 205. During steps H to L, a mechanical pressure is applied across the thickness of the sheet material while the head 201 is translated and rotated across the second substrate 204, thereby acting to force out any air between the sheet material and the second substrate to prevent air inclusions from being formed. As with steps B to F, steps H to L may include translation of the second substrate in addition to, or instead of, translation of the head 201 across the second substrate 204.

The process then finishes at step A, where the positive pressure applied through the openings causes the backing paper 210 to fall away from the head 201 to be disposed of. The step of applying positive pressure to cause the backing paper 210 to be removed may be caused by the curved portion 205 being rotated a further amount so that none of the openings 206 are connected to the negative pressure port 208. After the backing paper 210 is removed, the process then repeats with a subsequent piece of sheet material.

A positive air pressure is optionally applied to the positive pressure port 209 only once the sheet material 202 has been transferred to the second substrate, to serve the dual purpose of separating the backing paper 210 from the head 201 as well as performing a cleaning operation to remove any loose debris from the head prior to a subsequent transfer operation. In certain embodiments, both the negative and positive air pressures are continuously applied to the positive and negative air ports 209, 208 during transfer operations. Control of how the different air pressures are applied can then be dictated solely by the rotational orientation of the openings 206 on the arced or curved outer portion 205 of the head 201 relative to the central portion 211 of the head 201, as explained in further detail below. Additional control of the air pressure lines, for example using a controller and one or more solenoid valves, would therefore not necessarily be required.

The sheet material, for example in the form of an adhesive gasket, is preferably configured to have a higher degree of tack between the backing paper and the gasket material compared with that between the gasket material and the first substrate, which allows the sheet material 202 to be removed from the first substrate by applying a vacuum as shown in FIGS. 2 and 3.

Figure 4:
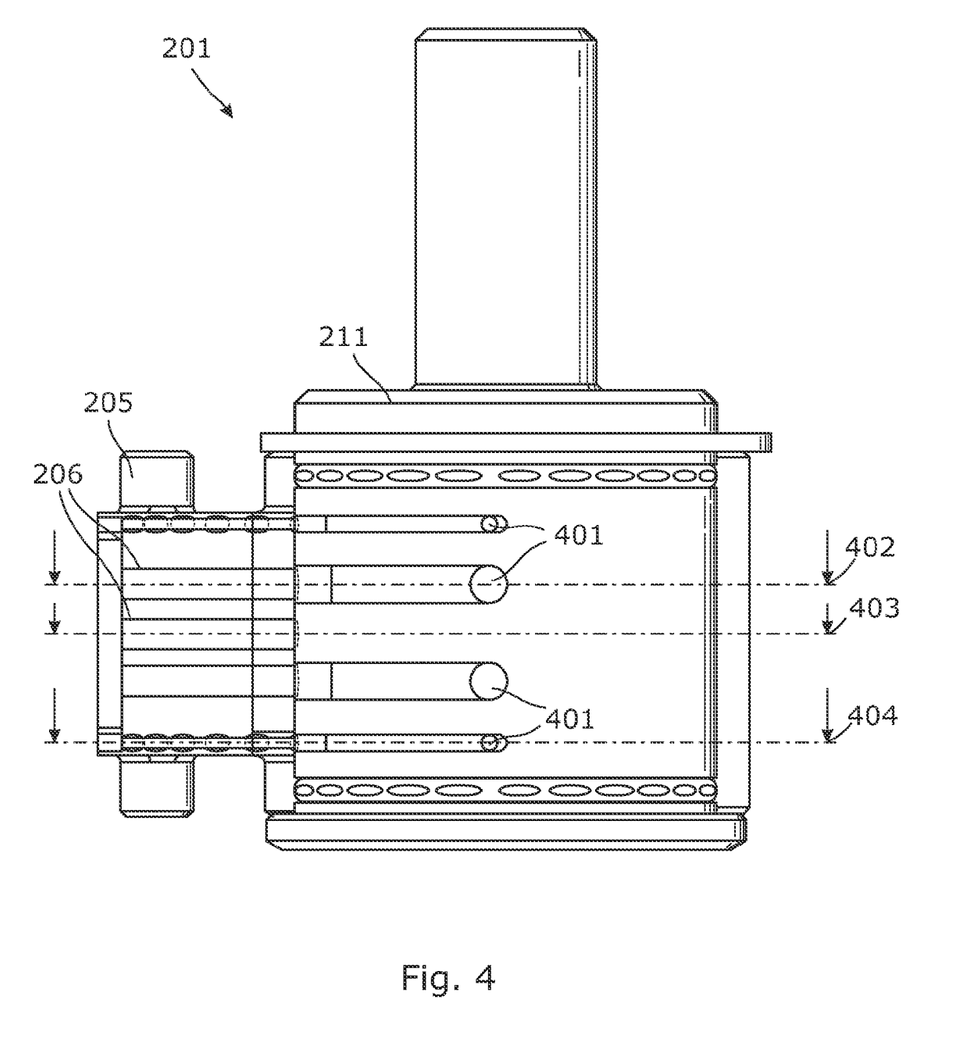
FIG. 4 is an elevation view of a pick and place head.

FIG. 4 illustrates the rotatable and translatable head 201 in side elevation view, showing the arced or curved portion 205 having openings 206 connected through to the ports 208, 209 (FIG. 2) via internal passageways 401 within the central portion 211 of the head.

Figure 5A:
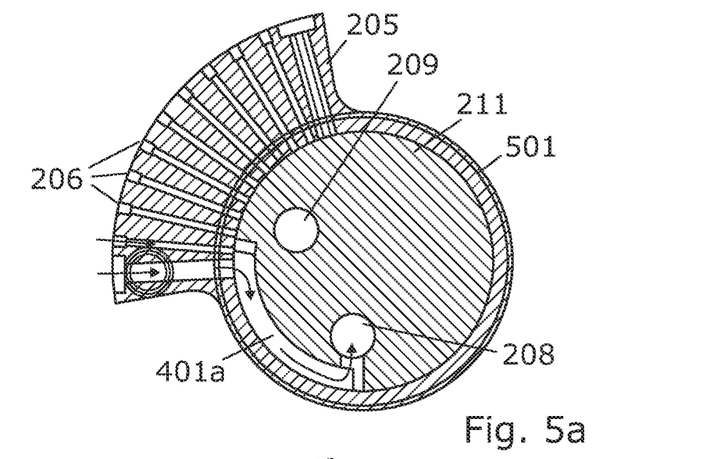
FIGS. 5a-5c are different cross-sectional views of the pick and place head of FIG. 4.
Figure 5B:
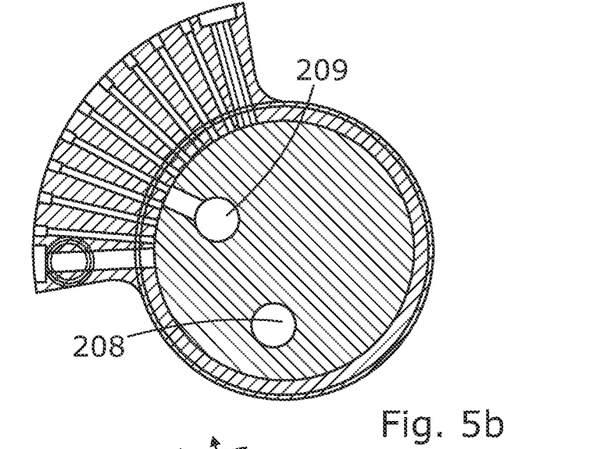
Figure 5C:
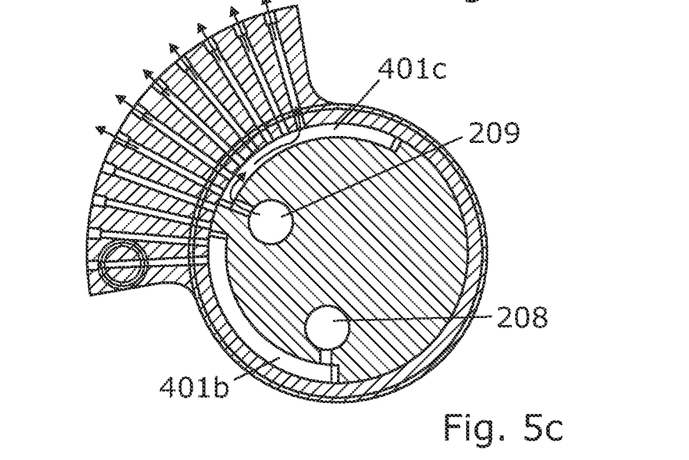

FIGS. 5a, 5b and 5c show sectional views taken along sections 402, 403, 404 in FIG. 4, in which the arrangement of the internal passageways or plenums 401 is further illustrated. First and second passageways 401a, 401b around an outer circumference of the central portion 211 of the head 201 are connected to the negative pressure port 208, and a third passageway 401c is connected to the positive pressure port 209. Arrows in FIG. 5a indicate the direction of air flow through openings in the arced or curved portion 205 into the first passageway 401a towards the negative pressure port 208. Arrows in FIG. 5c indicate the direction of air flow from the positive pressure port 209 through the third passageway 401c towards openings in the arced or curved portion 205. In a general aspect therefore, the central portion 211 of the head 201 comprises a first plenum 401a/401b connected to a first port 208, the first plenum extending circumferentially around a first part of the central portion 211 of the head 201. The central portion may additionally comprise a second plenum 401c connected to a second port 209, the second plenum 401c extending circumferentially around a second part of the central portion 211 of the head 201, the second part being different from the first part.

FIGS. 5a-c also show how the arced or curved portion 205 is rotatable relative to the central portion 211, by being connected to a rotatable ring 501 that surrounds the central portion 211. Rotating the ring 501 anti-clockwise from the position in FIG. 5a relative to the central portion 211 results in successive openings 206 around the arced or curved portion 205 of the head 201 becoming connected to the negative pressure port 208 via first and second internal passageways 401a, 401b. Rotating the ring 501 clockwise from the position in FIG. 5a, on the other hand, results in successive openings 206 becoming connected to the positive pressure port 209 via third internal passageway 401c.

The rotatable ring 501 may be connected to a servomotor, which is controlled together with the translation mechanism to synchronise rotation with translation during transfer of the sheet material from the first substrate to the second substrate. Alternatively, rotation of the ring 501 may be actuated by means of the mechanical pressure applied across the sheet material as the head is translated across the first and second substrates during the separation and application phases of the process. The mechanism according to the invention may be used in conjunction with conventional pick and place machinery, which may be numerically or manually controlled.

Positional registration of the head 201 may be achieved by physically locating one or more projecting pegs and corresponding holes on the outer surface of the curved portion of the head and the first and second substrates.

A controlled degree of friction between the rotatable ring and the central portion of the head may be achieved by means of seals provided to ensure a fluid tight seal for the internal passageways in the head, or may be achieved through the use of a further component such as an internal sprung friction pad.

Multiple heads may be employed on extended shafts, which may be configured to operate in parallel on first and second substrates comprising multiple locations for transferring sheet material from and to.

Rotational motion of the curved portion of the head may be achieved through friction alone, or may be controlled by mechanical engagement with the substrates, for example through the use of a rack and pinion type of arrangement. Servo motor control of the curved portion of the head may alternatively be used.

In alternative configurations, the head 201 may be configured to be operable using negative pressure only, i.e. with no positive pressure supply to force the release of the backing paper. Instead, the backing paper may be allowed to fall away from the head after application of the sheet material to the second substrate, or a further component may be used to mechanically eject the backing paper. In such embodiments, the internal porting of the head may be configured such that the vacuum applied to the backing paper 210 is fully released after the sheet has been deposited on the second substrate 204 (FIG. 2). The backing paper may, for example, be released from the head 201 by actuation of an ejector component configured to protrude from the outer face 207 upon rotation of the curved portion 205 beyond the position shown in step L of FIG. 2. The ejector component may be in the form of a mechanical shoe which protrudes from the outer face at the appropriate point in the sequence of operations. An advantage of such alternative embodiments is that a positive pressure line would not be required. Possible disadvantages of not using a positive pressure line would be that the backing paper might not be reliably released from the head and incorporating an ejector component would tend to increase the complexity of the construction of the head.

Other embodiments are also within the scope of the invention, as defined by the appended claims.

Although particular aspects, configurations, and embodiments have been disclosed herein in detail, this has been done by way of example and for the purposes of illustration only. The aforementioned are not intended to be limiting with respect to the scope of the appended claims, which follow. It is contemplated by the inventors that various substitutions, alterations, and modifications may be made to the invention without departing from the spirit and scope of the invention as defined by the claims. In addition, the above described embodiments may be used in combination unless otherwise indicated.

The invention claimed is:

1. A mechanism for transferring a flexible sheet material from a first substrate to a second substrate, wherein the sheet material comprises a flexible component for a fuel cell assembly and the second substrate comprises a less flexible component for the fuel cell assembly, the mechanism comprising:
a head rotatable and translatable relative to a first substrate and a second substrate;
the head forming a cylindrical curved portion having an outer face across which are provided a plurality of openings configured to apply air pressure to sheet material contacting the outer surface,
whereby the head is adapted to transfer the sheet material from the first substrate to the second substrate by a combination of rotation and translation of the head,
wherein the cylindrical curved portion of the head is rotatable relative to a central portion of the head, the cylindrical curved portion circumferentially extending only partially around the central portion, the central portion of the head comprising a first port for applying negative pressure to the openings with the curved portion in a first rotated position relative to the central portion and a second port for applying a positive pressure to the openings with the curved portion in a second rotated position relative to the central portion;
wherein the position of the curved portion relative to the central portion defines the connection or disconnection of the openings to the ports; and
wherein seals are provided between the rotatable ring and the central portion such that when the openings and a port are disconnected, the seals provide a fluid tight seal for the port.

2. The mechanism of claim 1 wherein the mechanism is configured to lift the sheet material from the first substrate by applying a negative air pressure to the openings while rotating the head during translation of the head relative to a surface of the sheet material.

3. The mechanism of claim 1 or claim 2 wherein the mechanism is configured to apply the sheet material to the second substrate by combined relative rotation and translation of the head across a surface of the second substrate.

4. The mechanism of any preceding claim wherein the mechanism is configured to apply a positive air pressure to the openings during or after application of the sheet material to the surface of the second substrate.

5. The mechanism of any preceding claim wherein the mechanism is configured to apply mechanical pressure to the second substrate across the thickness of the sheet material during application of the sheet material to the surface of the second substrate.

6. The mechanism of claim 1 wherein the first and second ports and the openings in the curved portion are configured to sequentially apply air pressure to the openings as the curved portion is rotated relative to the central portion.

7. The mechanism of claim 6 wherein the central portion of the head comprises a first plenum connected to the first port extending circumferentially around a first part of the central portion of the head and a second plenum connected to the second port extending circumferentially around a second part of the central portion of the head.

8. A method for transferring a sheet material from a first substrate to a second substrate using a fuel cell assembly head, wherein the sheet material comprises a flexible component for a fuel cell assembly and the second substrate comprises a less flexible component for the fuel cell assembly,
wherein the head comprises a cylindrical curved portion rotatable relative to a central portion, the cylindrical curved portion circumferentially extending only partially around a central portion of the head, the position of the curved portion relative to the central portion defining the connection or disconnection of the openings to the ports and wherein seals provided between the rotatable ring and the central portion such that when the openings and a port are disconnected, the seals provide a fluid tight seal for the port,
wherein the method comprises the steps of:
providing a head, the head including an arced portion having an outer face across which are provided openings configured to apply air pressure to sheet material contacting the outer surface,
wherein the arced portion of the head is rotatable relative to a central portion of the head, the central portion of the head comprising a first port applying negative pressure to the openings with the arced portion in a first rotated position relative to the central portion and a second port for applying a positive pressure to the openings with the arced portion in a second rotated position relative to the central portion;

positioning the arced portion over the sheet material on the first substrate;

rotating and translating the arced portion across the sheet material while applying a negative air pressure to the openings in an outer face of the arced portion;

translating the sheet material on the head from the first substrate to a second substrate; and, applying the sheet material to the second substrate by rotating and translating the arced portion across surface of the second substrate.

9. A method of manufacturing a fuel cell comprising the method of claim 8, wherein the sheet material comprises a gasket material and the second substrate comprises a planar electrode component for a fuel cell assembly.

* * * * *